United States Patent
Wu et al.

(10) Patent No.: US 6,504,335 B1
(45) Date of Patent: Jan. 7, 2003

(54) AUTOMATIC ADJUSTMENT METHOD OF THE CONCEALED MAIN SHAFT DYNAMIC BALANCE

(75) Inventors: Tung-Chuan Wu, Hsinchu (TW); Jih-Jong Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/938,678

(22) Filed: Aug. 22, 2001

(51) Int. Cl.[7] ................................................ F16C 3/00
(52) U.S. Cl. ..................... 318/676; 318/16; 464/180; 464/183
(58) Field of Search ................. 318/16, 671, 676; 464/179, 180, 182, 183; 74/84 R

(56) References Cited

U.S. PATENT DOCUMENTS

| | | | | |
|---|---|---|---|---|
| 5,140,856 A | * | 8/1992 | Larsen | |
| 5,277,063 A | * | 1/1994 | Thomas | ....................... 73/457 |
| 5,388,470 A | * | 2/1995 | Marsh, Jr. | ................... 74/84 R |

* cited by examiner

*Primary Examiner*—Bentsu Ro
(74) *Attorney, Agent, or Firm*—W. Wayne Liauh

(57) ABSTRACT

A method is designed to adjust automatically the dynamic balance of the main shaft of a processing machine. The method involves the use of a micro-electromechanical technique for a precision measurement of the imbalance quantity of the dynamic balance of the main shaft. The data are transmitted by the radio transmission technique to an automatic adjustment mechanism for adjusting the dynamic balance in conjunction with the phase difference of the rotary rings and a step-by-step motor.

5 Claims, 3 Drawing Sheets

AUTOMATIC ADJUSTMENT METHOD OF THE CONCEALED MAIN SHAFT DYNAMIC BALANCE

FIELD OF THE INVENTION

The present invention relates generally to an automatic adjustment method of the main shaft dynamic balance, and more particularly to an automatic adjustment method of the concealed main shaft dynamic balance.

BACKGROUND OF THE INVENTION

The dynamic balance precision of the main shaft is crucial to the precision with which a workpiece is processed by a tool or grinding wheel at a high speed ranging between 20000 rpm and 250000 rpm.

As shown in FIG. 1, a prior art method for adjusting the main shaft dynamic balance involves the use of a dynamic balance instrument 10 which is mounted at the external portion of the main shaft of a processing machine, a dynamic balance instrument controller 11 and two dynamic balance rings 12 mounted respectively at two ends of the main shaft. The calibration of the dynamic balance is attained by the two dynamic balance rings 12 in conjunction with the dynamic balance instrument 10 by means of which the dynamic imbalance is measured. On the basis of the dynamic imbalance, the required weight is calculated. The adjustment of the dynamic balance of the main shaft is done manually. This manual adjustment method is generally used before a processing machine is shipped out of the premises of a maker of the processing machine. In other words, such a prior art method as described above can not be employed to adjust the dynamic balance of the main shaft of a processing machine in operation.

As shown in FIG. 2, another prior art method for adjusting the dynamic balance of the main shaft involves the use of an automatic adjustment mechanism 13 which is mounted on one end of the main shaft and is formed of two rotary rings 14. The rotary rings 14 are provided with particles (not shown in the drawing). The processing machine is externally provided with a dynamic balance external controller 15 which is connected with the automatic adjustment mechanism 13 for measuring the phase difference of the particles of the two rotary rings 14. The two rotary rings 14 are adjusted by means of the automatic adjustment mechanism 13, thereby resulting in the correction of the phase difference. This prior art method is complicated in design and is therefore not cost-effective. For example, it uses the complicated and costly circuit. In addition, the automatic adjustment mechanism 13 and the rotary rings 14 take up too much of the available space.

SUMMARY OF THE INVENTION

The primary objective of the present invention is to provide an automatic adjustment method of the concealed main shaft dynamic balance, which involves the application of a micro-electromechanical technique to the deposition of a frequency spectrum analyzer in the interior of a main shaft for analyzing the dynamic imbalance of the main shaft with precision. The analysis data are transmitted by radio.

It is another objective of the present invention to provide an automatic adjustment method of the concealed main shaft dynamic balance. The method is precise in view of the basis of the phase difference of the rotary rings in conjunction with the error of the step-by-step motor automatic adjustment main shaft dynamic balance. A permanent magnet and a coil are directly disposed on a spindle by means of which the power is provided internally.

The method of the present invention comprises a first step in which the main shaft is provided with two rotary rings. The rotary rings are provided with a particle and an electromagnetic structure. The main shaft is internally provided with an automatic adjustment mechanism of dynamic balance, a step-by-step motor for actuating the rotary rings, and a dynamic balance analyzer. The interior of the main shaft is provided with a frequency spectrum analyzer made by a micro-electromechanical technique. The spindle of the main shaft is radially provided with at least one permanent magnet which is circumvented by a coil.

DETAILED DESCRIPTION OF THE INVENTION

Figure 1:
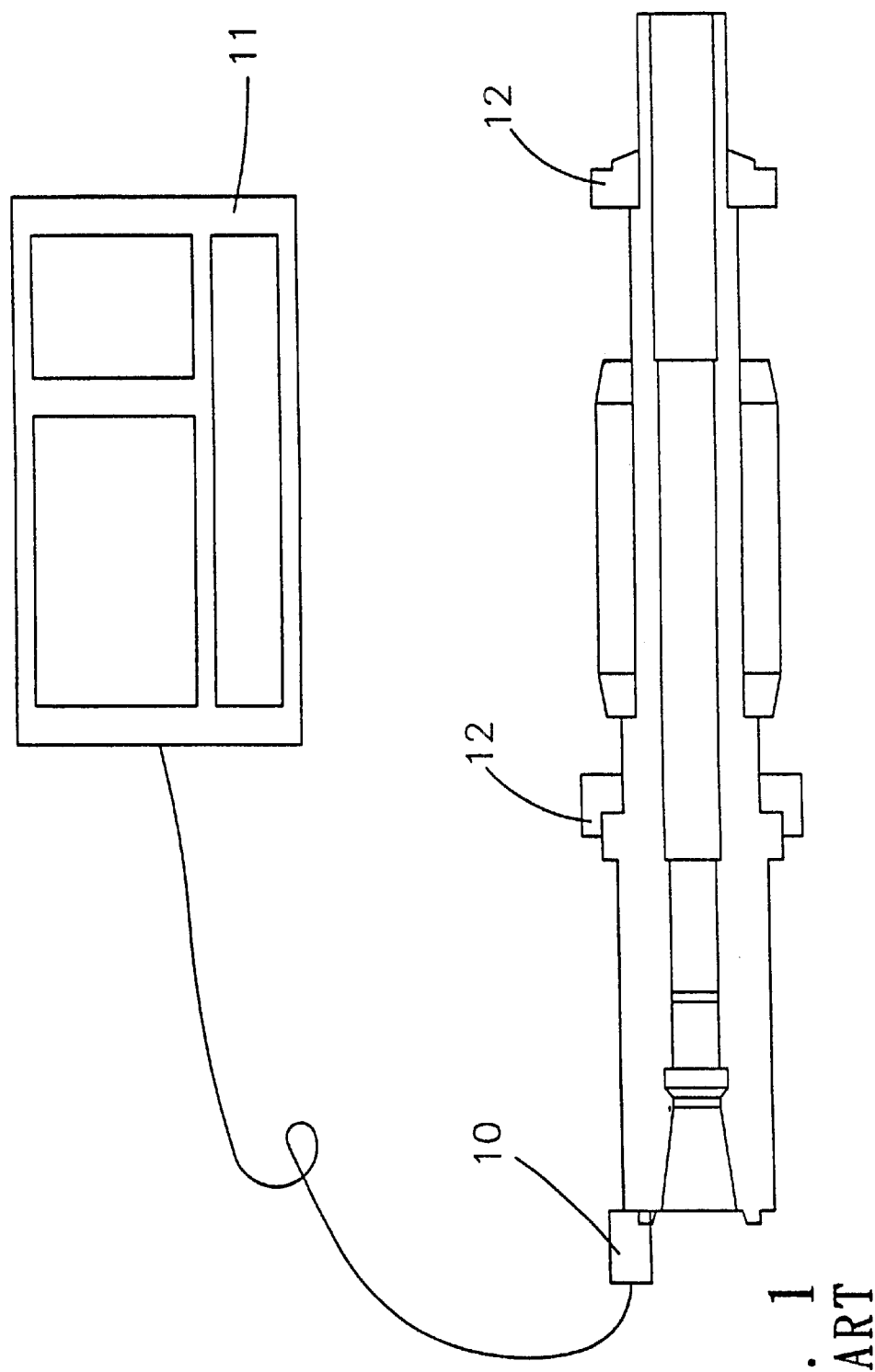
FIG. 1 shows a schematic view of a prior art method for adjusting the dynamic balance of the main shaft.
Figure 2:
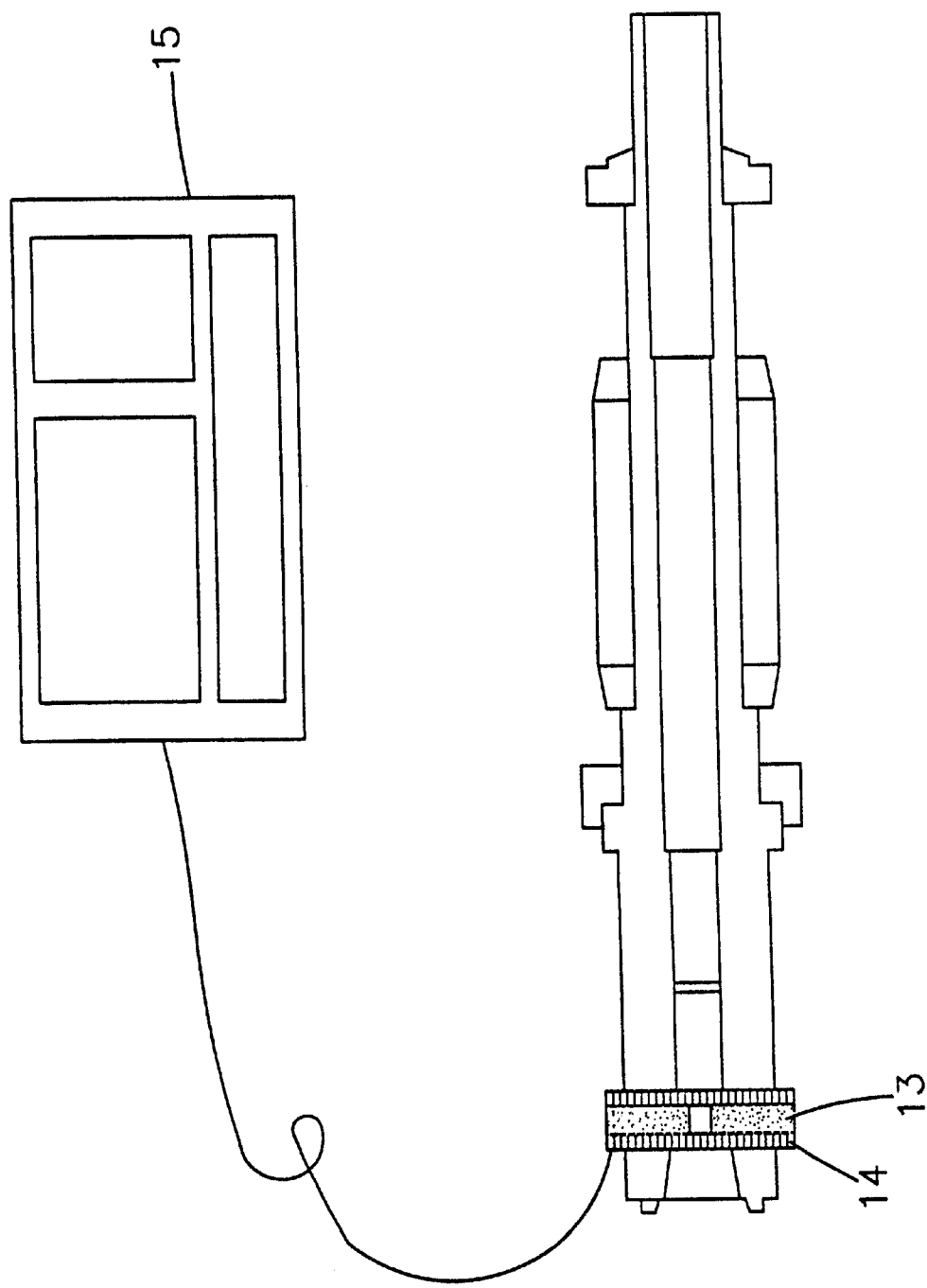
FIG. 2 shows a schematic view of another prior art method for adjusting the dynamic balance of the main shaft.
Figure 3:
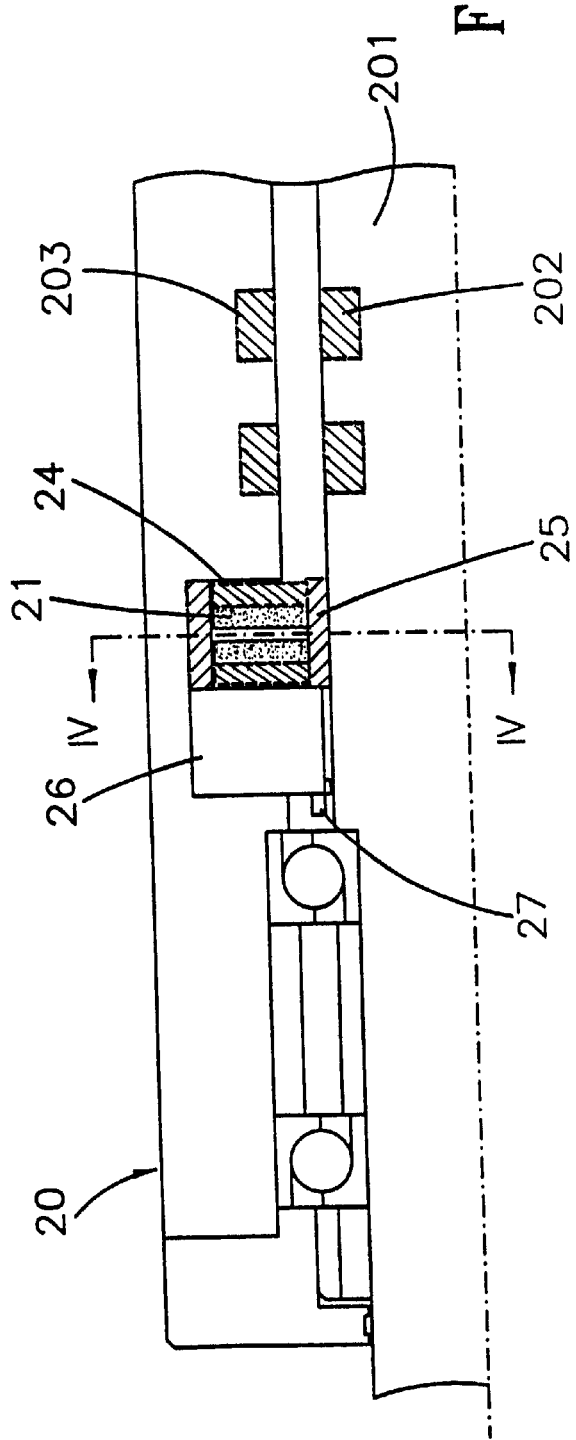
FIG. 3 shows a sectional view of the main shaft of the present invention.

As shown in FIG. 3, the method of the present invention comprised the following steps.

Figure 4:
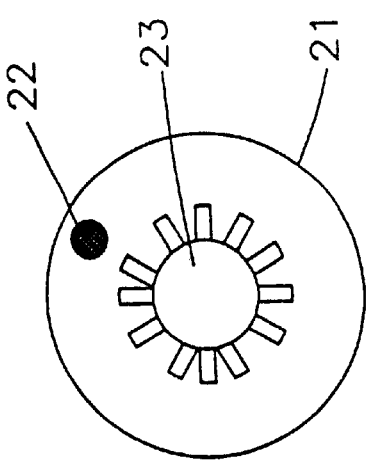
FIG. 4 shows a sectional view of the rotary ring of the present invention.

A main shaft 20 is provided with a spindle 201 which is provided with two rotary rings 21 which are in turn provided with a particle 22, as shown in FIG. 4, and a locating structure 23 which may be an electromagnetic locking structure.

The main shaft 20 is internally provided with an automatic adjustment mechanism of dynamic balance 24, a step-by-step motor 25 for actuating the rotary rings 21, and a dynamic balance analyzer 26 made by a micro-electromechanical technique. The interior of the main shaft 20 is provided with a frequency spectrum analyzer 27 made by the micro-electromechanical technique. Finally, the spindle 201 is provided radially with at least one set of permanent magnet 202 which is circumvented by a coil 203.

The tool or grinding wheel, which is mounted on the spindle 201, is turned. As the spindle 201 is turned, the permanent magnet 201 is turned along to bring about a rotational magnetic field, thereby resulting in the change in the magnetic flux on the coil 203. As a result, voltage and current are brought about. The current is guided to a semiconductor rectifier and a voltage stabilizer (mounted in the interior of the main shaft, not shown in the drawings). The stabilized voltage is introduced to the related machine members of the main shaft 20.

When the spindle 201 is in motion, the dynamic balance analyzer 26 analyzes via the frequency spectrum analyzer 27 the imbalance quantity of the dynamic balance of the main shaft 20. By means of the radio transmission technique, such as RF or infrared rays, the corrected data are transmitted to the automatic adjustment mechanism of dynamic balance 24, thereby enabling the automatic adjustment mechanism 24 to relieve the rotary rings 21 of the locking state of the locating structure 23.

In conjunction with the phase difference of the particles 22 of the rotary rings 21, the automatic adjustment mechanism 24 drives the step-by-step motor 25 according to the data provided by the dynamic balance analyzer 26, so as to adjust automatically the dynamic balance of the main shaft 20. Upon completion of the adjustment, the locating structure 23 is once again kept in the locking state. The main shaft 20 rotates at a high speed with precision. Accordingly, the spindle 201 rotates at a high speed with precision to enable a tool to process a workpiece with precision.

The present invention has advantages over the prior art methods. The advantages of the present invention are described hereinafter.

The dynamic balance automatic measurement equipments of the present invention are made by the micro-electromechanical technique which is widely employed in the production of the lightweight and precision electronic equipments at a relatively low cost. According to the method of the present invention, the frequency spectrum analyzer is disposed in the interior of the main shaft for precision analysis of the imbalance quantity of the main shaft. In addition, the present invention makes use of the radio transmission technique to transmit the data. The radio transmission technique does not take up the space.

In view of the basis of the phase difference of the rotary rings as well as the error of the step-by-step motor automatic adjustment of the main shaft dynamic balance, the method of the present invention is precise and free of deficiencies of the prior art methods. In addition, the power source of the method of the present invention is internally provided by means of the permanent magnet and the coil, which are disposed on the spindle of the main shaft. The power source of the prior art methods is externally provided.

The embodiment of the present invention described above is to be regarded in all respects as being merely illustrative and not restrictive. Accordingly, the present invention may be embodied in other specific froms without deviating from the spirit thereof. The present invention is therefore to be limited only by the scopes of the following claims.

What is claimed is:

1. A method for adjusting automatically the dynamic balance of a main shaft of a processing machine, said method comprising the steps of:

(a) providing the main shaft with two rotary rings which are provided with a particle and a locating structure;

(b) providing in an interior of the main shaft with an automatic adjustment mechanism of dynamic balance, a step-by-step motor for actuating the rotary rings, a dynamic balance analyzer, and a frequency spectrum analyzer, the main shaft being provided with a spindle which is provided with at least one set of permanent magnet and a coil circumventing the permanent magnet;

(c) starting to turn the main shaft to which a tool is fastened, thereby causing the permanent magnet to turn to bring about a rotating magnetic field which results in a change in the magnetic flux of the coil to generate a voltage and a current for use by the related machine parts of the interior of the main shaft;

(d) analyzing the imbalance quantity of the dynamic balance of the main shaft in operation by the dynamic balance analyzer via the frequency spectrum analyzer, with the analysis data being transmitted by a radio transmission technique to the automatic adjustment mechanism of dynamic balance, which relieves the rotary rings of the locking state of the locating structure; and (e) in conjunction with the phase difference of the particles of the rotary rings, starting the step-by-step motor to adjust automatically the dynamic balance of the main shaft before recovering the locking state of the locating structure.

2. The method as defined in claim 1, wherein said locating structure is an electromagnetic locking structure.

3. The method as defined in claim 1, wherein the current generated by the permanent magnet is first processed by a semiconductor rectifier and a voltage stabilizer before being made available to the related machine parts of the main shaft.

4. The method as defined in claim 1, wherein the radio transmission technique takes the form of RF.

5. The method as defined in claim 1, wherein said radio transmission technique takes the form of infrared rays.

* * * * *